(12) United States Patent
Ma

(10) Patent No.: US 8,322,757 B2
(45) Date of Patent: Dec. 4, 2012

(54) COUPLING FLANGE ASSEMBLY FOR CONNECTING STEEL PIPES

(75) Inventor: Renle Ma, Shanghai (CN)

(73) Assignee: Inner Mongolia Golden Ocean New Energy Technology Corporation Co., Ltd., Inner Mongolia (CN)

( * ) Notice: Subject to any disclaimer, the term of this patent is extended or adjusted under 35 U.S.C. 154(b) by 466 days.

(21) Appl. No.: 12/524,319

(22) PCT Filed: Nov. 2, 2007

(86) PCT No.: PCT/CN2007/071012
§ 371 (c)(1), (2), (4) Date: Nov. 5, 2009

(87) PCT Pub. No.: WO2008/092350
PCT Pub. Date: Aug. 7, 2008

(65) Prior Publication Data
US 2010/0117353 A1    May 13, 2010

(51) Int. Cl.
*F16L 23/026* (2006.01)
*E04H 12/08* (2006.01)
(52) U.S. Cl. ............ 285/416; 285/412; 52/849
(58) Field of Classification Search .......... 285/416, 285/368, 412; 52/223.15, 584.1, 848, 849
See application file for complete search history.

(56) References Cited

U.S. PATENT DOCUMENTS

| | | | | |
|---|---|---|---|---|
| 3,652,110 A * | 3/1972 | Manton | | 285/328 |
| 3,694,990 A * | 10/1972 | Pamer | | 52/839 |
| 3,909,049 A * | 9/1975 | Blatnica | | 285/329 |
| 4,281,859 A * | 8/1981 | Davies | | 285/55 |
| 4,288,105 A * | 9/1981 | Press | | 285/55 |
| 4,432,572 A * | 2/1984 | Thalmann | | 285/412 |
| 4,448,448 A * | 5/1984 | Pollia | | 285/112 |
| 6,766,570 B1 * | 7/2004 | Klemm et al. | | 29/455.1 |
| 7,096,639 B2 | 8/2006 | Wobben | | |
| 7,628,869 B2 * | 12/2009 | Martin et al. | | 148/320 |
| 7,665,273 B2 * | 2/2010 | Fuellhaas et al. | | 52/745.04 |
| 2004/0036293 A1 * | 2/2004 | Flindall | | 285/412 |
| 2004/0093825 A1 * | 5/2004 | Lee | | 52/731.2 |
| 2004/0112002 A1 * | 6/2004 | Wobben | | 52/720.1 |
| 2007/0122601 A1 * | 5/2007 | Martin et al. | | 428/220 |
| 2008/0054634 A1 * | 3/2008 | Dole | | 285/337 |

FOREIGN PATENT DOCUMENTS

| | | |
|---|---|---|
| CN | 2618989 Y | 6/2004 |
| EP | 292754 A1 * | 11/1988 |
| EP | 0 292 754 B1 | 7/1994 |

OTHER PUBLICATIONS

EPO Bibliographic data: Abstract (English) of CN2618989(Y).
EPO Bibliographic data: Abstract (English) of CN1509368(A) and related publications.

* cited by examiner

*Primary Examiner* — James Hewitt
(74) *Attorney, Agent, or Firm* — Paul Y. Feng; The Eclipse Group LLP

(57) ABSTRACT

A coupling flange assembly for connecting steel pipes including coupling flanges having stiffening plates located on the front side of the flange plate along axial directions of the steel pipes towards a coupling surface of the steel pipe to be connected. Equilibrium contact surfaces are set up on front end surfaces of the stiffening plates. Two abutting coupling flange assemblies may be used to connect two steel pipes, and when the two steel pipes are connected, the equilibrium contact surfaces of each stiffening plate of the coupling flange assemblies will be in contact with each other on a one-to-one basis.

12 Claims, 7 Drawing Sheets

COUPLING FLANGE ASSEMBLY FOR CONNECTING STEEL PIPES

CROSS-REFERENCE TO RELATED APPLICATIONS

This application is a U.S. national phase of PCT/CN2007/071012 filed 2 Nov. 2007, claiming priority from CN200710002674.5 filed 26 Jan. 2007.

TECHNICAL FIELD

This invention relates to a pipe coupling flange and its assembling method, especially to a flange assembly, a coupling flange and its assembling method used for large-scale steel pipes such as cylindrical pylons (also known as "tower pipe") of large-scale wind power generators and other steel pipe structures that have the same stress features.

BACKGROUND ART

See FIG. 1. Rigid flanges are generally used in the connection of most steel pipes at present. This rigid flange comprises: Flange Plate 1 welded along the wall of Steel Pipe 3, several Bolt Holes 11 set up on Flange Plate 1, and several Stiffening plates 2 set up on the back of Flange Plate 1. Stiffening plates 2 are welded and fixed to the wall of Steel Pipe 3 and the back of Flange Plate 1 so that Stiffening plates 2 are distributed in the radial direction along Steel Pipe 3. Both pipes are connected by inserting bolts into Bolt Holes 11 on Flange Plate 1. This coupling flange has the following disadvantages when it is used for fatigue dynamic structures: thickness of Flange Plate 1 is limited. The diameter of the bolt is so large that is a little hard to meet the requirement on pre-tightening force of a friction-type high-strength bolt. And its Connecting Welding Seam 7 is subject to the shearing and bending moment effects brought by the pulling force of the bolt. The greater the pulling force of the bolt and the farther away the bolt is from the pipe wall, the greater the bending moment gets. This bending moment will pass through Stiffening plate 2 and impose a radial pressure on the wall of Steel Pipe 3, and thus lead to a large hoop stress of the pipe wall, which has an adverse effect on the stress of Steel Pipe 3. Especially when the bolt is under a great pulling force, the flange will split along the upper and lower flange binding surfaces and the bending rigidity cannot be kept unchanged.

Due to the disadvantages of the rigid flange and because wind power generators are subject to the circulating dynamic effects of the rotation of wind wings, pylons are required have sufficient structural strength and bonding strength to withstand such fatigue dynamic load and to withstand the ultimate load brought by maximum wind pressure. The flange connection parts need to have unchanged bending rigidity to withstand fatigue dynamic load. Therefore said rigid flange cannot be used for the pylon connection of wind power generators.

In order to overcome these disadvantages of the rigid flange described above, a thick flange is usually used to connect the cylindrical pylons of large-scale wind power generators. As shown in FIG. 2, this thick flange comprises Flange Plate 1 and Connecting Pipe 14 sticking out of the back of the vertical Flange Plate 1. Connecting Pipe 14 is welded to End Surface 31 at the coupling end of Steel Pipe 3. Several bolt holes are set up on Flange Plate 1 into which Bolts 16 can be inserted for bolt fixation.

This thick flange provides a thicker Flange Plate 1 and longer bolts. Therefore it is easier to impose and control its pre-tightening force than those of the rigid flange. And it meets the requirement that the bonding strength and rigidity of the cylindrical pylons of large wind power generators should be kept unchanged. But the greatest disadvantages of this thick flange are:

1. Great steel consumption and high material cost. And the flange has to be formed through overall casting. The per-ton cost is 2.5~3 times of the average cost of ordinary steel structures. And the material used to manufacture this flange is mostly imported. Therefore, this thick flange increases the cost of the structure part of the wind power generators and serious affects and popularization and development progress of wind power generators.

2. Deviation of bolt holes of the thick flange is difficult to deal with and adds to the difficulty of assembling.

To sum up, coupling flanges in the prior art are not very suitable for the connection of cylindrical pylons of large-scale wind power generators and connection of other steel pipe structures that have the same stress features. They cannot provide the reliable bonding strength needed by cylindrical pylons of large-scale wind power generators or ensure that the tensile rigidity remains the same under continuous circulating dynamic loads. Neither can they save steel consumption, reduce the machining difficulty, nor reduce the manufacturing and assembling costs.

SUMMARY OF THE INVENTION

The technical problem to be solved by this invention is to provide a flange assembly, a coupling flange, and its assembling method that are suitable for the connection of large-scale steel pipes such as cylindrical pylons of large-scale wind power generators. They provide reliable bonding strength and ensure that the tensile rigidity remains unchanged under circulating dynamic load. They totally meet the stress requirements of wind power generator pylons, save steel consumption, reduce machining difficulty, and thus greatly reduce the manufacturing and assembling costs.

One flange assembly provided by this invention comprises a flange plate and several stiffening plates. Several bolt holes are set up on the flange plate. The stiffening plates are located on the frontal side of the flange plate along the axial direction of the steel pipe towards the coupling end surface. And equilibrium contact surfaces are set up at the front surfaces of the stiffening plates. In the assembled state, the coupling end surfaces of both steel pipes and the equilibrium contact surfaces of both abutting flange assemblies will contact each other. During the assembling process, two identical flange assemblies can be combined to assemble a complete coupling flange. Since only flange assemblies of the same specification need to be machined, the machining process can be simpler and the machining cost will be reduced.

This invention also provides the assembling method for said flange assembly, comprising the following steps:

A. Respectively weld two flange plates onto the walls of both steel pipes;

B. Weld stiffening plates onto the front side of the flange plate on one side;

C. Align the stiffening plates (not welded yet) on the other side to the already welded stiffening plates so that they contact the equilibrium contact surfaces of the welded stiffening plates. Then use a fastening device to tightly clamp the aligned stiffening plates with the welded stiffening plates;

D. Align both steel pipes and connect the coupling end surfaces of them. Align the bolt holes in both flange plates, and fix the position of the flange plate to which stiffening plates have not been attached;

E. Weld the stiffening plates to the flange plate to which the stiffening plates have not been welded;

F. Dismantle the fastening device and use bolts to connect the two flange plates.

In the preferred embodiment, the front segments of stiffening plates on both sides extrude out of the side surfaces at the free ends of both flange boards along the radial directions opposite to the bolt holes. In Step C, the fastening device used comprises a ring-shaped hoop and a wedge block. The ring-shaped hoop is used to sheath the extruding parts of stiffening plates on both sides and the wedge block is put into the ring-shaped hoop to achieve the fastening effect.

In Step D of the preferred embodiment, both flange plates and connected with bolts to temporarily fix the position of the flange plate to which stiffening plates have not been welded. This could make sure the coupling end surfaces of both steel pipes are aligned. And in step F, the bolts are further fastened to connect both flange plates and meet the request of the pre-tightening force.

A coupling flange provided by this invention comprises an upper flange assembly and a lower flange assembly. The upper flange assembly comprises an upper flange plate and several upper stiffening plates. The lower flange assembly comprises a lower flange plate and several lower stiffening plates. Bolt holes are set up on the upper and lower flange plates on a one-on-one basis. The upper stiffening plates are set up on the front surface of the upper flange plate along the axis of the upper steel pipe towards its coupling end surface. The lower stiffening plates are set up on the front surface of the lower flange plate along the axis of the lower steel pipe towards its coupling end surface. Said stiffening plates are provided on a one-on-one basis. Upper equilibrium contact surfaces are set up on the front end surface of the upper stiffening plates and lower equilibrium contact surfaces are set up on the front end surface of the lower stiffening plates. Said upper and lower equilibrium contact surfaces are connected. And the coupling end surfaces of the upper and lower steel pipes are connected.

In the preferred embodiment, said upper and lower equilibrium contact surfaces are distributed on local parts of the front end surfaces of the upper and lower stiffening plates. Coupling end surfaces of said upper and lower steel pipes are located on one side of said bolt holes. And said upper and lower equilibrium contact surfaces are located on the front end surfaces on the other side of the bolt holes opposite to the coupling end surfaces of the upper and lower steel pipes.

The preferred embodiment also includes an upper flange pipe and a lower flange pipe. The back end of the upper flange pipe is a welding end that has the same pipe diameter as that of the coupling end surface. Its front end is a coupling end. The upper flange plate is welded to the wall of the upper flange pipe. The welding end of the upper flange pipe of the upper flange assembly is welded to the coupling end surface of the upper steel pipe; the front end of the lower flange pipe is a coupling end that connects the upper flange pipe. Its back end is a welding end. The lower flange plate is welded to the wall of the lower flange pipe. The welding end of the lower flange pipe of the lower flange assembly is welded to the coupling end surface of the lower steel pipe. The coupling end surfaces of the upper and lower steel pipes are connected through the coupling ends of the upper and lower flange pipes.

In the preferred embodiment, said upper and lower flange assemblies are inner coupling flanges.

In the preferred embodiment, said upper and lower flange assemblies are outer coupling flanges.

This invention also provides the assembling method for said coupling flange, comprising the following steps:

A. Respectively weld two flange plates onto the walls of both flange pipes;

B. Weld stiffening plates onto the front side of the flange plate on one side;

C. Align the stiffening plates (not welded yet) on the other side to the already welded stiffening plates so that they contact the equilibrium contact surfaces of the welded stiffening plates. Then use a fastening device to tightly clamp the aligned stiffening plates with the welded stiffening plates;

D. Align both flange pipes and connect the coupling end surfaces of both flange pipes. Align the bolt holes in both flange plates on a one-on-one basis, and fix the position of the flange plate to which stiffening plates have not been welded;

E. Weld the stiffening plates to the flange plate to which the stiffening plates have not been welded;

F. Dismantle the fastening device;

G. Butt-weld the welding ends of both flange pipes with the coupling end surfaces of both steel pipes;

H. Connect both flange plates with bolts.

In the preferred embodiment, the front segments of stiffening plates on both sides extrude out of the side surfaces at the free ends of both flange boards along the radial directions opposite to the bolt holes. In Step C, the fastening device used comprises a ring-shaped hoop and a wedge block. The ring-shaped hoop is used to sheath the extruding parts of stiffening plates on both sides and the wedge block is put into the ring-shaped hoop to achieve the fastening effect.

In Step D of the preferred embodiment, both flange plates and connected with bolts to temporarily fix the position of the flange plate to which stiffening plates have not been welded. This could make sure the coupling end surfaces of both steel pipes are aligned. And in Step F, the bolts are further fastened to connect both flange plates and achieve the pretightening force.

According to the scheme described above, this invention has the following significant technical effects on the prior art:

1. This invention moves the stiffening plates from the back side of the flange plate to the front side of the flange plate. This is opposite to the prior flanges. And equilibrium contact surfaces are set up one stiffening plates. Therefore after steel pipes are assembled and connected, not only the coupling end surfaces of abutting steel pipes but also the equilibrium contact surfaces of stiffening plates contact each other and get stressed. Therefore, the bending moment created by said equilibrium contact surfaces can basically offset the pulling stress moment imposed on steel pipes walls by bolts through the stiffening plates to achieve a balance. The effect of the bending moment of the stiffening plates on the connecting can be basically eliminated, the hoop stress (or pressure stress) of steel pipes can be reduced, and forces on the welding seams can be greatly reduced. Only shearing force and small pulling force will be imposed on welding seams. This both provides reliable bonding strength and ensures the anti-fatigue performance of welding seams. The tensile rigidity remains unchanged under circulating dynamic load, which totally meets the stress requirements of wind power generator pylons. In addition, since the bending moment effect of the stiffening plates on the connecting welding seams on the steep pipe walls is basically eliminated, it can avoid trend in existing art to increase the height of stiffening plates in order to reduce the hoop stress imposed by stiffening plates on the pipe walls. This invention can reduce the height of stiffening plates.

2. Since the coupling flange of this invention comprises relatively light and thin flange plate and stiffening plates, it consumes much less steel compared with prior thick flanges. The coupling flange of this invention is about 30% lighter than existing thick flanges. Therefore the material cost will be reduced. In addition, since the stress of the entire flange is improved, the steel parts in this invention can be made by welding ordinary steel plates. Therefore it solves the disadvantage that all thick cast flanges used for current wind power pylons are basically purchased from abroad. Besides, no large casting equipment is needed by the manufacturing process. The manufacturing cost can be reduced. The unit-weight cost of this invention is only 40%-50% of the current thick flanges. The assembling cost of the entire flange is reduced by about 60%, which increased the allowable cost of the structure part of wind power generator sets and boosts the popularization and development progress of wind power generators.

3. Compared with prior thick flanges, this invention can increase the length of friction-type high-strength bolts without increasing the thickness of the flange plate. And the bolts are relative smaller in diameter which can facilitate the precise control of pre-tightening force and assembling and provide more significant anti-fatigue, anti-loosening, and maintenance-free properties. It can reduce the frequency of repairs or even free the flange from maintenance. The operating intervals of nuts are not subject to the influence of stiffening plates and bolts can be more densely and compactly placed, which reduces the 2-D size of the flange plate. Therefore under the same bonding strength, the flange plate can be thinner, which saves more steel.

BRIEF DESCRIPTION OF THE DRAWINGS

This invention will be further described with the following figures and embodiments.

DETAILED DESCRIPTION OF THE PREFERRED EMBODIMENTS

This invention will be further described with detailed pictures so that the technical approaches, creative features, purposes, and effects of this invention can easily understood.
Embodiment 1

Figure 1:
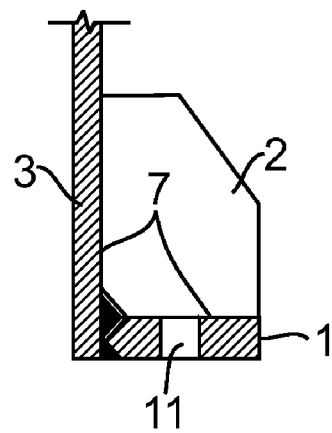
FIG. 1 is a sectional schematic view of the prior flange assembly.
Figure 2:
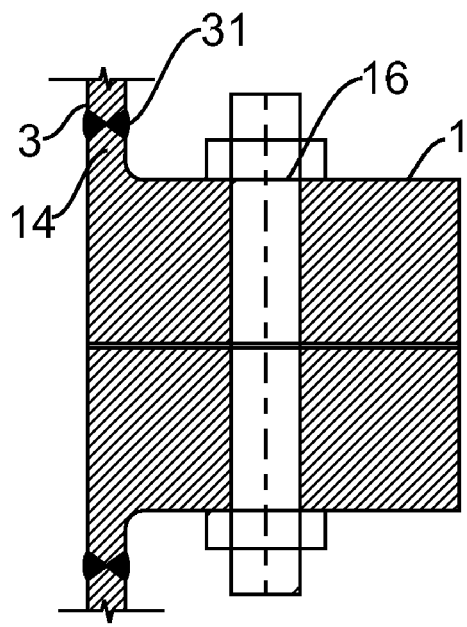
FIG. 2 is a sectional schematic view of the prior thick flange assembly.
Figure 3:
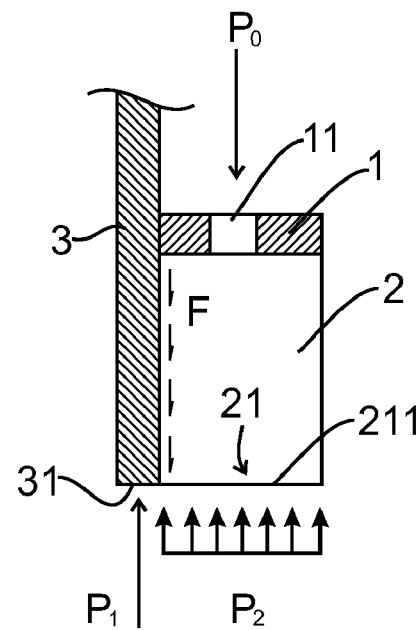
FIG. 3 is a sectional view of a flange assembly in Embodiment 1 of this invention.

As shown in FIG. 3, this invention provides a flange assembly comprising Flange Plate 1 and Stiffening Plates 2. In this embodiment, said Flange Plate 1 and Stiffening Plates 2 are located on the inner side of Steel Pipe 3, forming an internal flange assembly. The central axis of the upper and lower Steel Pipe 3 lies on the right of the figure. Several Bolt Holes 11 are set up on Flange Plate 1. Preferably, said Stiffening Plates 2 are evenly distributed along the wall of Steel Pipe 3. Said Bolt Holes 11 are located on the splitting line between the center lines of two neighboring Stiffening Plates 2. As a matter of fact, if there are just a few stiffening plates and each of them is thick enough, Bolt Holes 11 can also go through the main bodies of Stiffening Plates 2. This is optional. Said Bolt Holes 11 just have to connect the two abutting flange assemblies through fastening pieces such as bolts. Stiffening Plates 2 are located on the front side of Flange Plate 1 along the axis of Steel Pipe 3 towards Coupling End Surface 31 (refer to the direction of bolt acting force P0). Equilibrium Contact Surfaces 211 are set up on Front End Surfaces 21 of Stiffening Plates 2. In the preferred embodiment, said Equilibrium Contact Surfaces 211 and Coupling End Surface 31 of Steel Pipe 3 are milled or ground plane surfaces. During assembling, two identical flange assemblies are fitted together. Preferably, friction-type high-strength bolts are used to connect both flange assemblies through Bolt Holes 11, so that Coupling End Surfaces 31 of Steel Pipes 3 contact each other and get pressed, the pressure stress being P1. Equilibrium Contact Surfaces 211 of Stiffening Plates 2 also contact each other and get pressed, the pressure stress being P2. Therefore, the bending moment of Pressure Stress P1 created by Equilibrium Contact Surfaces 211 can basically offset the force moment of pulling stress P0 imposed by bolts on the walls of Steel Pipe 3 to achieve a balance. The adverse effect of the bending moment of Stiffening Plates 2 on the walls of Steel Pipe 3 is basically eliminated, the hoop stress of Steel Pipe 3 is greatly reduced, and shearing force F is imposed on welding seams. This both provides reliable bonding strength and ensures unchanged tensile rigidity under circulating dynamic load. It totally meets the stress requirements of wind power generator pylons and can reduce steel consumption and cost.

In an embodiment shown in FIG. 3, said Equilibrium Contact Surfaces 211 can be distributed over the entire Front End Surfaces 21 of Stiffening Plates 2.

Figure 4:
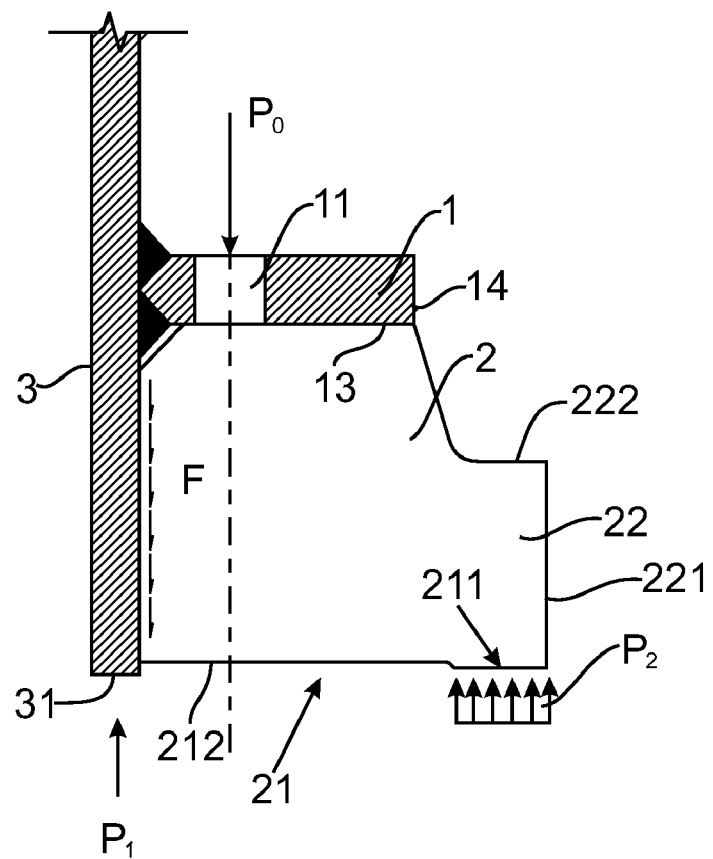
FIG. 4 is a sectional view of another flange assembly in Embodiment 1 of this invention.

In the embodiment shown in FIG. 4, said Equilibrium Contact Surfaces 211 are distributed on the local parts of Front End Surfaces 21 of Stiffening Plates 2. Preferably, Coupling End Surface 31 of said Steel Pipe 3 is located on one side of said Bolt Holes 11. And said Equilibrium Contact Surfaces 211 are located on Front End Surfaces 21 on the other side of the Bolt Holes 11 opposite to Coupling End Surface 31 of said Steel Pipe 3. This means Equilibrium Contact Surfaces 211 are set up on Front End Surfaces 21 on the inner side of Bolt Holes 11 in the radial direction close to the center axis of abutting Steel Pipe 3.

In the preferred embodiment shown in FIG. 4, Non-contact Surfaces 212 other than Equilibrium Contact Surfaces 211 on the inner sides of Front End Surfaces 21 of said Stiffening Plates 2 are indented. Said Equilibrium Contact Surfaces 211 extrude out of Front End Surfaces 21 and are level to Coupling End Surface 31 of Steel Pipe 3.

In the preferred embodiment shown in FIG. 4, the front segments of said Stiffening Plates 2 have Extruding Part 22 sticking out in the radial direction of Bolt Holes 11 away from bolt holes (i.e. towards the center axis of Steel Pipe 3). Side Surface 221 of Extruding Part 22 is higher than Free-end Side Surface 14 of Flange Plate 1. Back Surface 222 of said Extruding Part 22 is preferably a straight and level surface. One of the functions of this Extruding Part 22 is to elongate the arm of the pressure-stress bending moment of Equilibrium Contact Surfaces 211. If the same bolt pulling stress is to be balanced, the stress on Equilibrium Contact Surfaces 211 can be reduced, which helps reduce the flange plate thickness and overall dimensions of the flange assembly. Another important function of Extruding Part 22 is to hold a Ring-shaped Hoop 9 which is used to clamp the stiffening plates when the upper and lower flange assemblies are fitted together (See FIG. 9 and FIG. 10). In the preferred embodiment, the length of Extruding Part 22 along the axial direction of Steel Pipe 3 is smaller than the axial length of Stiffening Plates 2, which further reduces steel consumption and helps reduce the dimensions of said Ring-shaped Hoop 9.

In all of the embodiments described above, said Flange Plate 1 is directly welded to the wall of Steel Pipe 3 so that Coupling End Surfaces 31 of both Steel Pipes 3 are directly pressed together. And Stiffening Plates 2 are directly welded and fixed to Front End Surface 13 of Flange Plate 1 and the contacted part of the wall of Steel Pipe 3.

Figure 6:
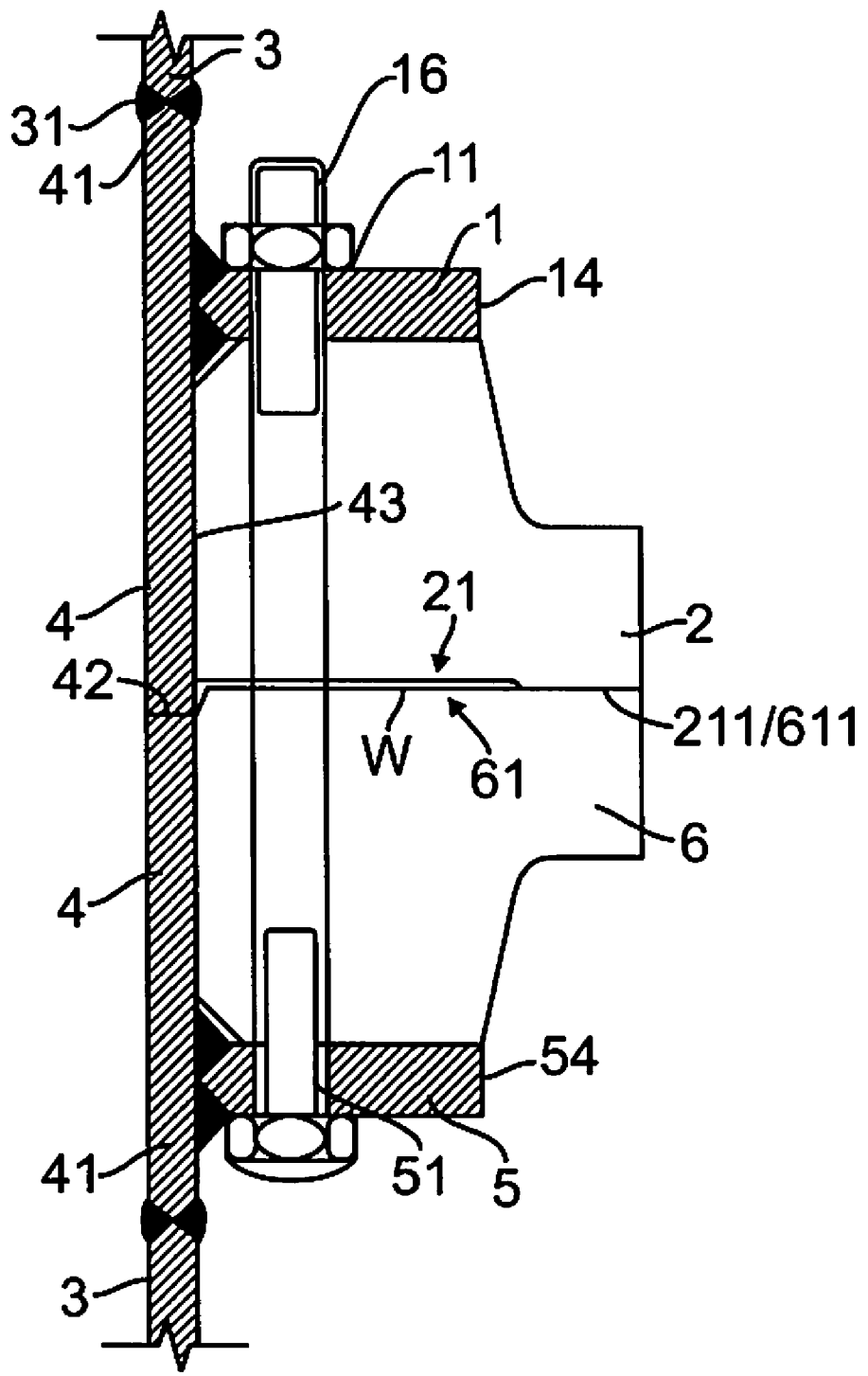
FIG. 6 is a sectional view of another preferred coupling flange in Embodiment 2 of this invention.

In the preferred embodiment shown in FIG. 6, said assembly can further comprise a Flange Pipe 4. The back end of Flange Pipe 4 is a Welding End 41 that has the same pipe diameter as that of Coupling End Surface 31 of Steel Pipe 3. Its front end is a Coupling End 42. Flange Plate 1 is first welded to the wall of Flange Pipe 4. Welding End 41 of Flange Pipe 4 is then welded to Coupling End Surface 31 of Steel Pipe 3. Therefore Coupling End Surfaces 31 of both Steel Pipes 3 are pressed indirectly through Coupling End 42 of Flange Pipe 4.

Embodiment 2

See FIG. 3-6. This embodiment basically has the same principles, structure, and effects as Embodiment 1, which will not be repeated here. The difference is: in this embodiment, said Flange Plate 1 and Stiffening Plates 2 are located on the outer side of Steel Pipe 3. Said flange assembly is embodied as an outer flange assembly. This embodiment basically has the same structure as Embodiment 1. Only the inner and outer flanges are different. The central axis of Steel Pipe 3 lies on the right of the figure. Please refer to Embodiment 1 for the details of the structure. They will not be repeated here.

Embodiment 3

Figure 5:
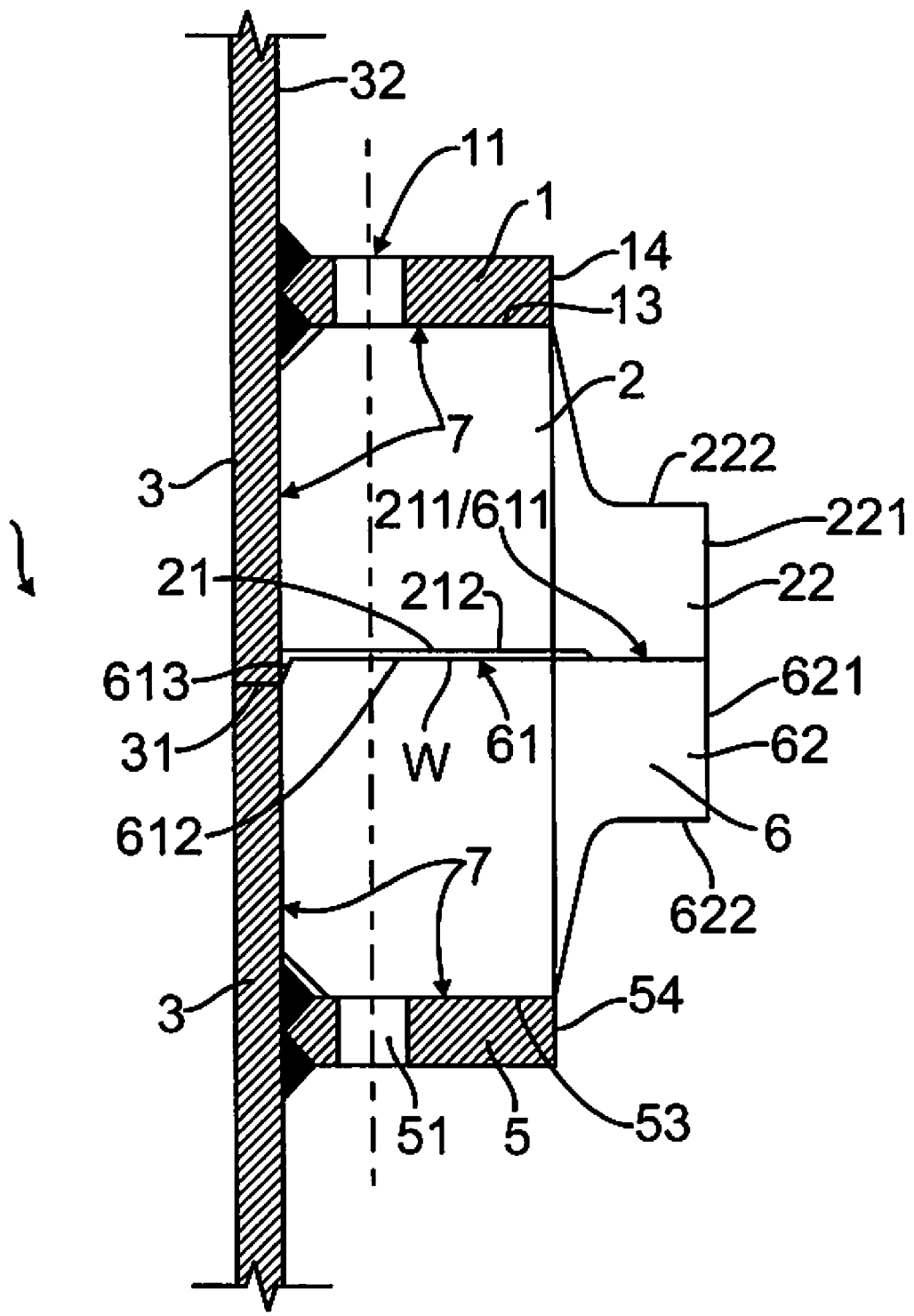
FIG. 5 is a sectional view of the coupling flange in Embodiment 2 of this invention.

See FIG. 5. This embodiment basically has the same principles, structures, and effects as Embodiment 1, which will not be repeated here. The difference is that the coupling flange of this embodiment directly comprises an upper assembly and a lower flange assembly fitted together.

This coupling flange comprises an upper flange assembly and a lower flange assembly. The upper flange assembly comprises an Upper Flange Plate 1 and several Upper Stiffening Plates 2. The lower flange assembly comprises a Lower Flange Plate 5 and several Lower Stiffening Plates 6. In this embodiment, said Upper Flange Plate 1, Lower Flange Plate 5, Upper Stiffening Plates 2, and Lower Stiffening Plates 6 are located on the inner side of Upper and Lower Steel Pipes 3. This coupling flange is an inner coupling flange. The center axis of Upper and Lower Steel Pipes 3 is on the left of the figure.

Bolt Holes 11 and Bolt Holes 51 are set up respective Upper Flange Plate 1 and Lower Flange Plate 5 on a one-on-one basis. Preferably, said several Upper Stiffening Plates 2 and Lower Stiffening Plates 6 are evenly distributed along the inner walls of Upper and Lower Steel Pipes 3. Said Bolt Holes 11 are located on the splitting line between the center lines of two neighboring Upper Stiffening Plates 2 and two neighboring Lower Stiffening Plates 6. As a matter of fact, if there are just a few Upper Stiffening Plates 2 and Lower Stiffening Plates 6 and each of them is thick enough, Bolt Holes 11 and 51 can also go through the main bodies of Upper Stiffening Plates 2 and Lower Stiffening Plates 6 without limited. Said Bolt Holes 11 just have to connect the abutting upper and lower flange assemblies through fastening pieces such as Bolts 16 (see FIG. 6). This invention is characterized in that: Said Upper Stiffening Plates 2 are located on the front side of Upper Flange Plate 1 along the axis of Upper Steel Pipe 3 towards Coupling End Surface 31, Said Lower Stiffening Plates 6 are located on the front side of Lower Flange Plate 5 along the axis of Lower Steel Pipe 3 towards Coupling End Surface 31 (i.e. the direction of bolt acting force P0 in FIG. 3). Said Upper Stiffening Plates 2 and Lower Stiffening Plates 6 are provided on a one-on-one basis. Upper Equilibrium Contact Surfaces 211 and Lower Equilibrium Contact Surfaces 611 are respectively set up on Front End Surfaces 21 and 61 of Upper Stiffening Plates 2 and Lower Stiffening Plates 6. Said Equilibrium Contact Surfaces 211 and Lower Equilibrium Contact Surfaces 611 are fitted together, and Coupling End Surfaces 31 of Upper Steel Pipe 3 and Lower Steel Pipe 3 are fitted together. During assembling, two flange assemblies are fitted together preferably by using friction-type high-strength bolts through Bolt Holes 11 and 51, so that Coupling End Surfaces 31 of Upper Steel Pipe 3 and Lower Steel Pipe 3 contact each other and get pressed. Upper Equilibrium Contact Surface 211 and Lower Equilibrium Contact Surface 611 of Upper Stiffening Plates 2 and Lower Stiffening Plates 6 also contact each other and get pressed. As shown in the force analysis in FIG. 4, the bending moment of created by Upper Equilibrium Contact Surface 211 and Lower Equilibrium Contact Surface 611 can basically offset the force moment of pulling stress P0 imposed by bolts on the walls of Upper Steel Pipe 3 and Lower Steel Pipe 3 to achieve a balance. The adverse effect of the bending moment of Upper Stiffening Plates 2 and Lower Stiffening Plates 6 on the walls of Steel Pipe 3 is basically eliminated, the hoop stress of Upper Steel Pipe 3 and Lower Steel Pipe 3 is greatly reduced, and the connecting welding seams are only subject to shearing force F. This both provides reliable bonding strength and ensures tensile rigidity unchanged under circulating dynamic loads. It perfectly meets the stress requirements of wind power generator pylons and can reduce steel consumption and cost.

In a embodiment as shown in FIG. 3, said Upper Equilibrium Contact Surface 211 and Lower Equilibrium Contact Surface 611 can be distributed over the entire Front End Surfaces 21 and 62 of Upper Stiffening Plates 2 and Lower Stiffening Plates 6. Front End Surfaces of Upper Stiffening Plates 2 and Lower Stiffening Plates 6 are fitted together as a whole.

In the embodiment shown in FIG. 5, said Upper Equilibrium Contact Surface 211 and Lower Equilibrium Contact Surface 611 are distributed on the local parts of Front End Surfaces 21 and 62 of Upper Stiffening Plates 2 and Lower Stiffening Plates 6. Preferably, Coupling End Surface 31 of said Upper Steel Pipe 3 and Lower Steel Pipe 3 is located on one side of said Bolt Holes 11. And said Upper Equilibrium Contact Surface 211 and Lower Equilibrium Contact Surface 611 are located on Front End Surfaces 21 and 61 on the other side of the Bolt Holes 11 opposite to Coupling End Surface 31 of Upper Steel Pipe 3 and Lower Steel Pipe 3. This means Upper Equilibrium Contact Surface 211 and Lower Equilibrium Contact Surface 611 are set up on Front End Surfaces 21 and 62 of Upper Stiffening Plates 2 and Lower Stiffening Plates 6 on the inner side of Bolt Holes 11 and 51 in the radial direction close to the center axis of abutting Steel Pipe 3.

In the embodiment shown in FIG. 5, there is a clearance W between the Upper Non-contact Surfaces 212 and Lower Non-contact Surfaces 612 other than Upper Equilibrium Contact Surface 211 and Lower Equilibrium Contact Surface 611 on Front End Surfaces 21 and 62 of Upper Stiffening Plates 2 and Lower Stiffening Plates 6.

In the preferred embodiment, said Non-contact Surfaces 212 are concave. Said Upper Equilibrium Contact Surfaces 211 extrude out of Front End Surfaces 21 of Upper Stiffening Plates 2. Front End Surfaces 61 of Upper Stiffening Plates 6 are plane surfaces. Lower Non-contact Surfaces 612 share the same plane with Lower Equilibrium Contact Surface 611, which means they are located in the same plane where Front End Surfaces 61 of Lower Stiffening Plates 6 are located.

In an embodiment as shown in FIG. 3, Upper Equilibrium Contact Surfaces 211 of said Upper Stiffening Plates 2 are level to Coupling End Surface 31 of Upper Steel Pipe 3 so that Coupling End Surface 31 and Upper Equilibrium Contact Surfaces 211 can be milled or ground level at the same time. Lower Equilibrium Contact Surfaces 611 of said Lower Stiffening Plates 6 are level to Coupling End Surface 31 of Lower Steel Pipe 3 so that Coupling End Surface 31 and Lower Equilibrium Contact Surfaces 611 can be milled or ground level at the same time. This could reduce the cost to some extent.

In a preferred embodiment as shown in FIG. 5, Upper Equilibrium Contact Surfaces 211 of Upper Stiffening Plates 2 can be lower than Coupling End Surface 31 of Upper Steel Pipe 3. And Front End Surfaces 61 of Lower Stiffening Plates 6 can be higher than Coupling End Surface 31 of Lower Steel Pipe 3. There is a Lead Angle Part 613 on Front End Surfaces 61 of Stiffening Plates 6 higher than Lower Steel Pipe 3 close to the wall of Lower Steel Pipe 3. Therefore, the higher part of Front End Surfaces 61 of Stiffening Plates 6 can be directed inserted into the indented part of Upper Stiffening Plates 2, providing a guiding effect. When bearing forces, the shearing resistance of the coupling part mainly comes from the friction force. Therefore this higher part can also acts as a backup unit that also provides anti-shearing effects.

In an embodiment, Upper Non-contact Surfaces 212 and Lower Non-contact Surfaces 612 of Upper Stiffening Plates 2 and Lower Stiffening Plates 6 are all concave. Said Upper Non-contact Surfaces 212 and Lower Non-contact Surfaces 612 extrude out of Front End Surfaces 21 and 61 of Upper Stiffening Plates 2 and Lower Stiffening Plates 6. The figure is omitted here. Upper Non-contact Surfaces 212 of Upper Stiffening Plates 2 are level to Coupling End Surface 31 of Upper Steel Pipe 3 so that Coupling End Surface 31 and Upper Equilibrium Contact Surfaces 211 can be milled or ground level at the same time. Lower Equilibrium Contact Surfaces 611 of said Lower Stiffening Plates 6 are level to Coupling End Surface 31 of Lower Steel Pipe 3 so that Coupling End Surface 31 and Lower Equilibrium Contact Surfaces 611 can be milled or ground level at the same time. This could reduce the milling cost.

According to symmetry principles, the designed structures of the upper and lower flange assemblies are totally interchangeable in the plan with a clearance W between Upper Non-contact Surfaces 212 and Lower Non-contact Surfaces 612. Especially Front End Surfaces 21 and 62 of Upper Stiffening Plates 2 and Lower Stiffening Plates 6 are interchangeable in their coupling and embedding relationship. The detailed structure will not be repeated here.

In the preferred embodiment, the front segments of said Upper Stiffening Plates 2 and Lower Stiffening Plates 6 have Extruding Parts 22 and 26 sticking out in the radial direction of Bolt Holes 11 and 51 away from bolt holes (i.e. towards the center axis of Steel Pipe 3). Side Surfaces 221 and 621 of Extruding Parts 22 and 26 are higher than Free-end Side Surfaces 14 and 54 of Flange Plate 1. Back Surfaces 222 and 622 of said Extruding Parts 22 and 26 are preferably straight and level surfaces. The length of Extruding Parts 222 and 622 along the axial direction of Upper Steel Pipe 3 and Lower Steel Pipe 3 is smaller than the axial length of Upper Stiffening Plates 2 and Lower Stiffening Plates 6. Functions of Extruding Parts 222 and 622 have been described in Embodiment 1 and will not be repeated here.

In the preferred embodiment as shown in FIG. 5, Upper Flange Plate 1 is directly welded to Pipe Wall 32 of Upper Steel Pipe 3. Upper Stiffening Plates 2 are respectively welded and fixed to Front Surface 13 of Flange Plate 1 and the contacted part of Pipe Wall 32 of Upper Steel Pipe 3 through Welding Seam 7. Said Lower Flange Plate 5 is welded to Pipe Wall 32 of Lower Steel Pipe 3. Lower Stiffening Plates 2 are respectively welded and fixed to Front Surface 53 of Lower Flange Plate 5 and the contacted part of Pipe Wall 32 of Lower Steel Pipe 3 through Welding Seam 7. In this way Coupling End Surface 31 of Upper Steel Pipe 3 and Lower Steel Pipe 3 can be directly pressed tight.

Figure 7:
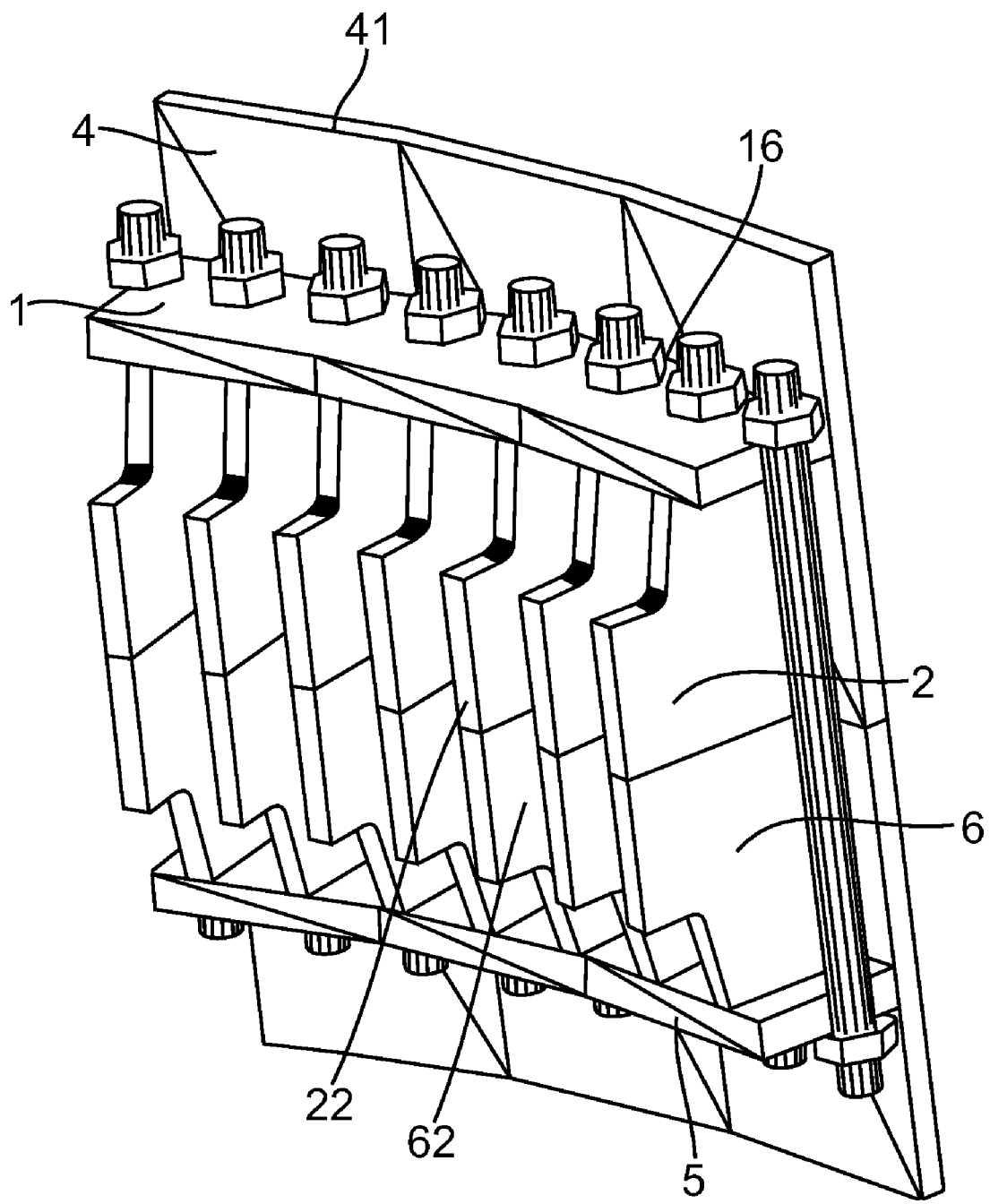
FIG. 7 is a local exploded view of the coupling flange in FIG. 6.
Figure 8:
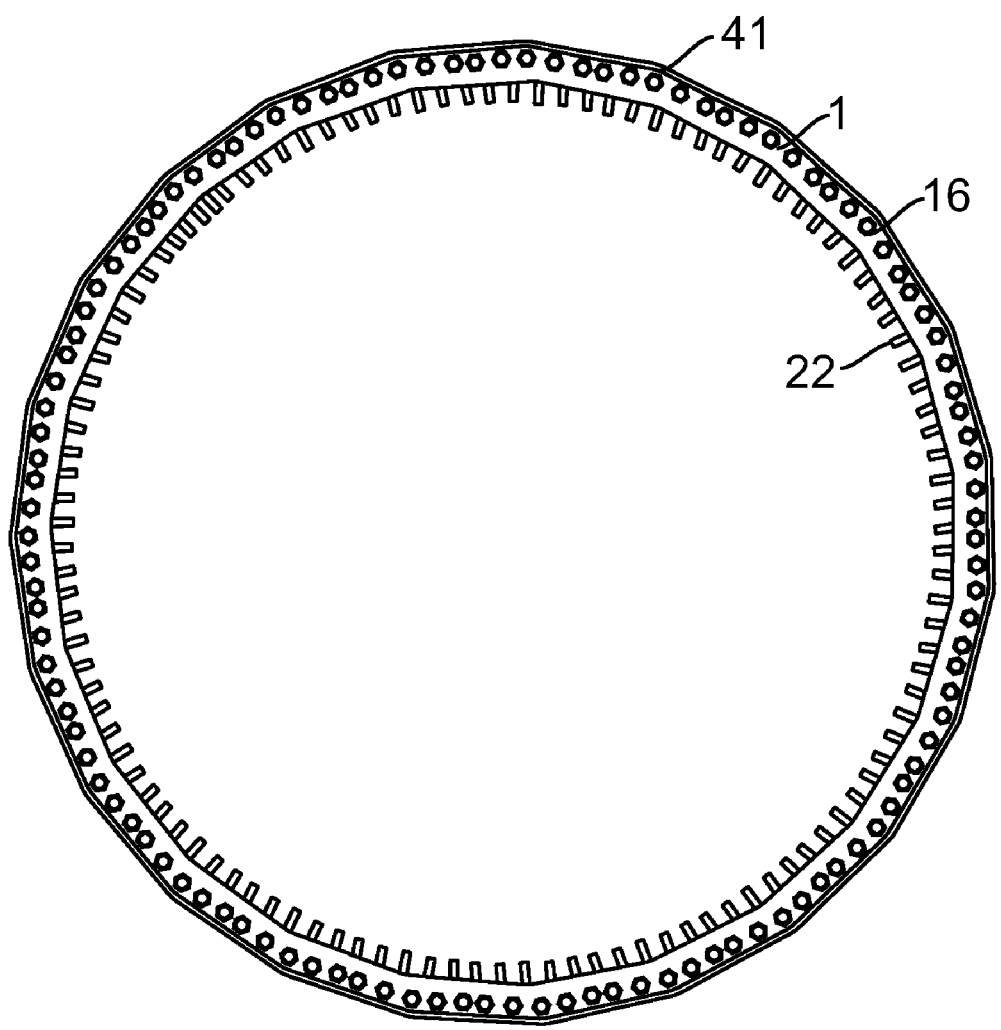
FIG. 8 is an overall end view of the coupling flange in FIG. 6 in the axial direction of the steel pipe.

In a most preferred embodiment as shown in FIGS. 6, 7, and 8, the upper and lower flange assemblies can further comprise Upper Flange Pipe 4 and Lower Flange Pipe 4. The back end of Upper Flange Pipe 4 is a Welding End 41 that has the same pipe diameter as that of Coupling End Surface 31 of Upper Steel Pipe 3. Its front end is a Coupling End 42. Upper Flange Plate 1 and Lower Flange Plate 5 are first welded to Wall of Upper Flange Pipe 4 and Lower Flange Pipe 4. Welding End 41 of Upper Flange Pipe 4 and Lower Flange Pipe 4 is then welded to Coupling End Surface 31 of Upper Steel Pipe 3 and Lower Steel Pipe 3. Therefore the entire upper and lower flange assemblies are welded to Coupling End Surface 31 of Upper Steel Pipe 3 and Lower Steel Pipe 3 through Welding End 41 of Upper Flange Pipe 4 and Lower Flange Pipe 4. And Coupling End Surface 31 of Upper Steel Pipe 3 and Lower Steel Pipe 3 are pressed indirectly through Coupling End 42 of Upper Flange Pipe 4 and Lower Flange Pipe 4.

Embodiment 4

See FIG. 5-8. This embodiment basically has the same principles, structures, and effects as Embodiment 3, which will not be repeated here. The difference is: in this embodiment, said Upper Flange Plate 1 and Lower Flange Plate 5 and Upper Stiffening Plates 2 and Lower Stiffening Plates 6 are located on the outer side of Upper Steel Pipe 3 and Lower Steel Pipe 3. Said upper and lower flange assemblies are embodied as outer flange assemblies. This embodiment basically have the same structures as Embodiment 3. Only the inner and outer flanges are different. They will not be repeated here. If they are embodied as outer coupling flanges as shown in FIG. 5-8, the right side of the figure becomes the center line of Upper Steel Pipe 3 and Lower Steel Pipe 3. Please refer to Embodiment 3 for the details of the structure.

Embodiment 5

Figure 9:
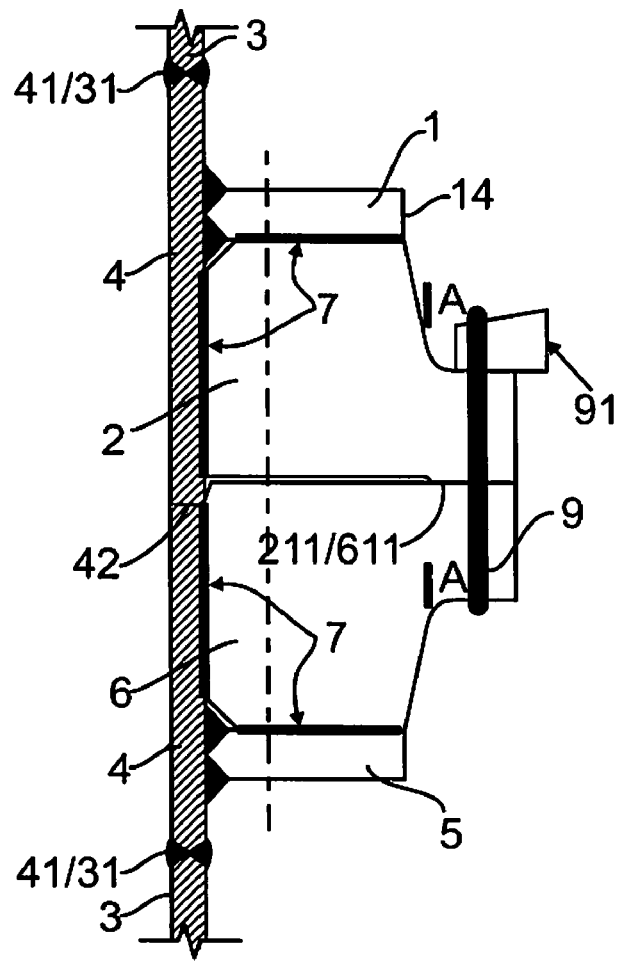
FIG. 9 is a schematic view of the fastened upper and lower stiffening plates in Embodiment 5 of this invention.
Figure 10:
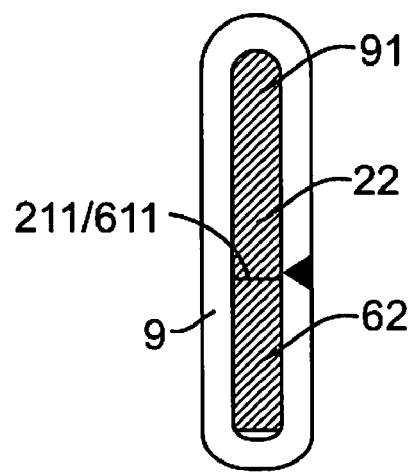
FIG. 10 is an A-A direction view of FIG. 9.

As shown in FIG. 9 and FIG. 10, this embodiment describes the manufacturing procedure and assembling method of the coupling flanges in Embodiment 3 and Embodiment 4, comprising the following steps:

1. Use an ordinary veneer reeling machine to make Upper Flange Pipe 4 and Lower Flange Pipe 4. Then weld them into the standard cylindrical shape that meets the manufacturing standard.

2. Mill or grind level Coupling End 42 between Upper Flange Pipe 4 and Lower Flange Pipe 4 (the thick flange has a much larger milling area than this invention).

3. Use carbon-air gouging or a milling lathe to machine, weld, and bevel Coupling End 41 between Upper Flange Pipe 4 and Lower Flange Pipe 4.

4. Machine the circular Upper Flange Plate 1 and Lower Flange Plate 5. Upper Flange Plate 1 and Lower Flange Plate 5 are not limited to circular shapes in case that the pipe does not have a circular section.

5. Weld Upper Flange Plate 1 to the pipe wall of Upper Flange Pipe 4 and weld Lower Flange Plate 5 to the pipe wall of Lower Flange Pipe 4. In the assembling method of the embodiment that does not include the upper and lower flange pipes, the upper and lower flange plates are directly welded to the walls of Upper Steel Pipe 3 and Lower Steel Pipe 3.

6. Machine Upper Stiffening Plates 2 and Lower Stiffening Plates 6 so that Extruding Parts 22 and 62 are formed on Upper Stiffening Plates 2 and Lower Stiffening Plates 6. Extruding Parts 22 and 62 can help fasten the upper and lower stiffening plates with the ring-shaped hoop as described below. However, other clamping devices can also be sued to fasten the upper and lower stiffening plates in the absence of Extruding Parts 22 and 62.

7. Weld all Upper Stiffening Plates 2 to Upper Flange Plate 1 (not necessarily all upper stiffening plates; one or two may also do). This involves the welding between Upper Stiffening Plates 2 and Front Surface 13 of Upper Flange Plate 1 and the welding between Upper Stiffening Plates 2 and Pipe Wall 13 of Upper Flange Pipe 4, as shown in FIG. 7.

8. Align Upper Stiffening Plates 2 to Lower Stiffening Plates 6 so that Upper Equilibrium Contact Surfaces 211 and Lower Equilibrium Contact Surfaces 611 are closely attached to each other. Use a fastening device such as Ring-shaped Hoop 9 (i.e. a "╫" shaped bolt) and Wedge Block 91 to sheath Extruding Parts 22 and 62 of Upper Stiffening Plates 2 and Lower Stiffening Plates 6 and then embed Wedge Block 91 into Ring-shaped Hoop 9 for fastening. For fastening, a group of Ring-shaped Hoop 9 and Wedge Block 91 can be used to respectively clamp the upper and lower stiffening plates group by group. Or several groups of Ring-shaped Hoops 9 and Wedge Blocks 91 can be used to clamp the all upper and lower stiffening plates on a one-on-one basis. Any method can do as long as it can firmly clamp the upper and lower stiffening plates and ensure that the upper and lower equilibrium contact surfaces meet the coupling requirements.

9. Align Lower Flange Pipe 4 (to which Lower Flange Plate 5 has been welded) to Upper Flange Pipe 4 (to which Upper Flange Plate 1 and Upper Stiffening Plates 2 have been welded). Align the centers of Bolt Holes 11 of Upper Flange Plate 1 to Bolt Holes 51 of Lower Flange Plate 5. Align the side surfaces of Extruding Parts 22 and 62 of Upper Stiffening Plates 2 and Lower Stiffening Plates 6. Then insert friction-type high-strength bolts into Bolt Holes 11 and 51 to temporarily fix the position of Lower Flange Plate 5. Then weld Lower Stiffening Plates 6 and Upper Stiffening Plates 2 of Upper Flange Plate 1 to Lower Flange Pipe 4 and Lower Flange Plate 5 in a one-on-one manner. In the assembling method of the coupling flange which does not include the upper and lower flange pipes, the upper and lower steel pipes should be directly aligned to each other.

10. Dismantle Ring-shaped Hoop 9 and Wedge Block 91 that fasten Upper Stiffening Plates 2 and Lower Stiffening Plates 6.

11. Weld Coupling End 31 of Upper Flange Pipe 4 and Lower Flange Pipe 4 (to which Upper Flange Plate 1, Lower Flange Plate 5, Upper Stiffening Plates 2 and Lower Stiffening Plates 6 have been welded) to Coupling End Surface 31 of Upper Steel Pipe 3 and Lower Steel Pipe 3. This step is not used in the assembling method of the embodiment in which upper and lower flange assemblies do not include upper and lower flange pipes.

12. Perform other follow-up treatments on Upper Steel Pipe 3 and Lower Steel Pipe 3.

13. Transport the assemblies to the construction site and further tighten the friction-type high-strength bolts to connect the upper and lower flange assemblies until the design pre-tightening force is reached and Coupling End Surface 31 of Upper Steel Pipe 3 and Lower Steel Pipe 3 and Equilibrium Contact Surfaces 211 and 611 of Upper Stiffening Plates 2 and Lower Stiffening Plates 6 are pressed together at the same time. If friction-type high-strength bolts are not used in Step 9 to go through Bolt Holes 11 and 51 for temporary fastening and another method is used to fix the position of the lower flange plate, friction-type high-strength bolts need to be used to connect the upper and lower flange assemblies in this step.

According to symmetry principles, it is obvious that in another preferred embodiment, we can also weld all Lower Stiffening Plates 2 first in Steps 7-9 instead of welding upper stiffening plates first to fix the position of the upper flange plate, and then weld the upper stiffening plates. This will no longer be repeated here.

This invention mainly provides a coupling flange and assembling method in which stiffening plates are set up inversely and equilibrium contact surfaces are set up on stiffening plates. Therefore, the flange of this invention can also be called "inverse equilibrium flange". Therefore, any simple and equivalent conversions by setting stiffening plates in front of flange plates and setting up equilibrium contact surfaces on stiffening plates (i.e. one the basis of this invention) belong to the protection scope of this invention.

And with regard to the assembling method, any claim should belong to protection scope of this invention as long as it uses a fastening device to clamp the upper and lower stiffening plates to ensure the coupling requirements of upper and lower equilibrium contact surfaces, regardless of whether the upper stiffening plates or lower stiffening plates are welded first.

The invention claimed is:

1. A coupling flange assembly for connecting a pair of upper and lower steel pipes, comprising:
    an upper flange assembly having a flange plate including a front side and a plurality of stiffening plates, wherein several bolt holes are set up on the flange plate, wherein the stiffening plates are located on the front side of the flange plate and along an axial direction of the upper steel pipe towards a coupling end surface of the upper steel pipe when in the assembled state; and
    a lower flange assembly having a flange plate having a front side and a plurality of stiffening plates, wherein several bolt holes are set up on the flange plate, wherein the stiffening plates are located on the front side of the flange plate and along an axial direction of the lower steel pipe towards a coupling end surface of the lower steel pipe when in the assembled state;
    wherein each of the stiffening plates has an extruding part extending beyond the flange plate and extending radially relative to the steel pipes when in the assembled state, wherein equilibrium contact surfaces are set up at front end surfaces of the stiffening plates, wherein in the assembled state, the coupling end surfaces of the steel pipes contact each other and the equilibrium contact surfaces of both the abutting upper and lower flange assemblies contact each other on a one-to-one basis; and
    wherein the flange plates of the upper flange assembly and the lower flange assembly are not in contact with each other.

2. The coupling flange assembly according to claim 1, wherein the equilibrium contact surfaces are distributed on the front end surfaces of the stiffening plates, away from a center line of the bolt holes.

3. The coupling flange assembly according to claim 2, wherein in the assembled state the coupling end surfaces of the steel pipes to be connected are located on one side of said bolt holes, and said equilibrium contact surfaces are located on the front end surfaces on the other side of the bolt holes opposite to the coupling end surfaces of the steel pipes.

4. The coupling flange assembly according to claim 3, wherein the front end surfaces of said stiffening plates further include non-contact surfaces other than the equilibrium contact surfaces, and in the assembled state, said non-contact surfaces form clearances when the equilibrium contact surfaces of both the abutting upper and lower flange assemblies contact each other on a one-to-one basis, and said equilibrium contact surfaces that extrude out of the front end surfaces are level to the coupling end surface of the corresponding steel pipe.

5. The coupling flange assembly according to claim 1, wherein in the assembled state, the flange plate of the upper flange assembly is welded to a wall of the upper steel pipe, and the flange plate of the lower flange assembly is welded to a wall of the lower steel pipe, and the stiffening plates are welded and fixed to the front side of the respective flange plates and the walls of the respective steel pipes, so that the coupling end surfaces of both steel pipes may be directly pressed together with the equilibrium contact surfaces of both the abutting upper and lower flange assemblies in contact with each other on a one-to-one basis.

6. The coupling flange assembly according to claim 1, wherein in the assembled state said flange plates and stiffening plates are located on an inner side of the steel pipes, forming an internal flange assembly.

7. The coupling flange assembly according to claim 1, wherein in the assembled state, said flange plates and stiffening plates are located on outer sides of the steel pipes, forming an external flange assembly.

8. A coupling flange for connecting upper and lower steel pipes, comprising:
   a flange plate having a back side and a front side that is nearer a coupling end surface of one of the steel pipes to be connected, and a plurality of fastening holes evenly distributed throughout the flange plate; and
   a plurality of stiffening plates, each having a front end surface, evenly distributed on the front side of the flange plate and along an axis of the steel pipe towards its coupling end surface when in the assembled state;
   wherein each of the stiffening plates has an extruding part extending beyond the flange plate and extending radially relative to the steel pipes when in the assembled state, wherein
   equilibrium contact surfaces are set up on the front end surfaces of the stiffening plates on the extruding parts.

9. The coupling flange according to claim 8, wherein there is a lead angle on the front end surface of the stiffening plates opposite the extruding part.

10. The coupling flange according to claim 8, wherein the fastening holes are located on a splitting line centered between center lines of pairs of neighboring stiffening plates.

11. The coupling flange according to claim 8, wherein a length of the extruding part of the stiffening plates is less than the overall length of the stiffening plates.

12. The coupling flange according to claim 8, wherein the fastening holes are configured for insertion of friction-type high-strength bolts.

\* \* \* \* \*